Nov. 20, 1962  W. L. SHEPPARD  3,064,669
GOVERNOR
Filed Jan. 4, 1957  3 Sheets-Sheet 1
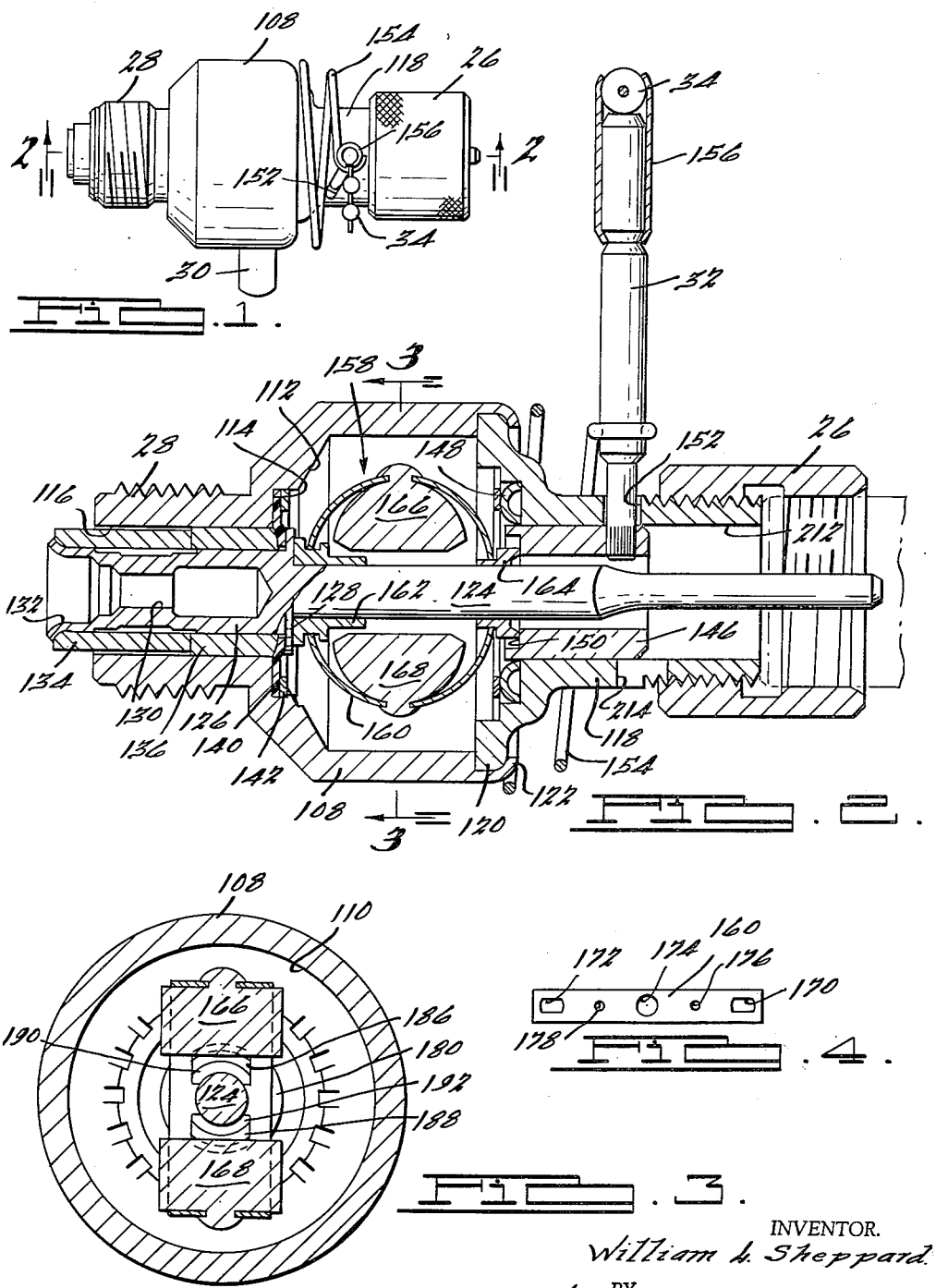
INVENTOR.
William L. Sheppard
BY
Harness, Dickey & Pierce
ATTORNEYS Nov. 20, 1962     W. L. SHEPPARD     3,064,669
GOVERNOR
Filed Jan. 4, 1957                                                     3 Sheets-Sheet 2
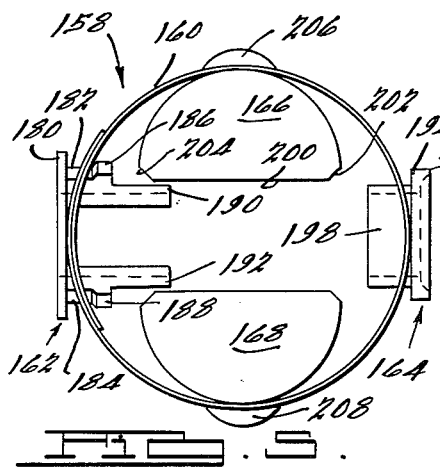
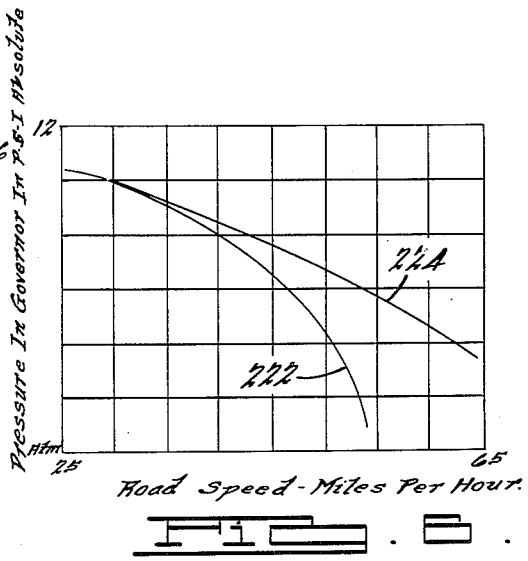
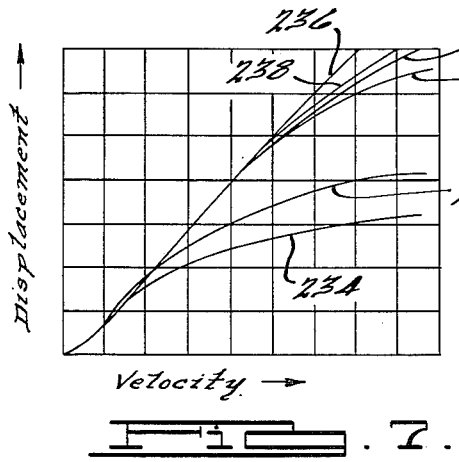
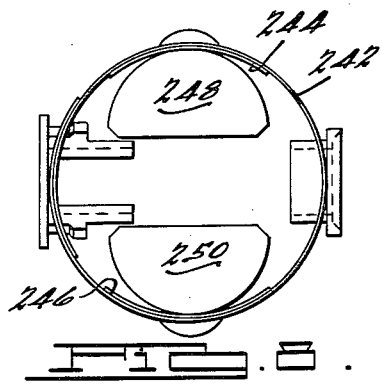
INVENTOR.
William L. Sheppard
BY
Harness, Dickey & Pierce
ATTORNEYS.

Nov. 20, 1962   W. L. SHEPPARD   3,064,669
GOVERNOR
Filed Jan. 4, 1957   3 Sheets-Sheet 3
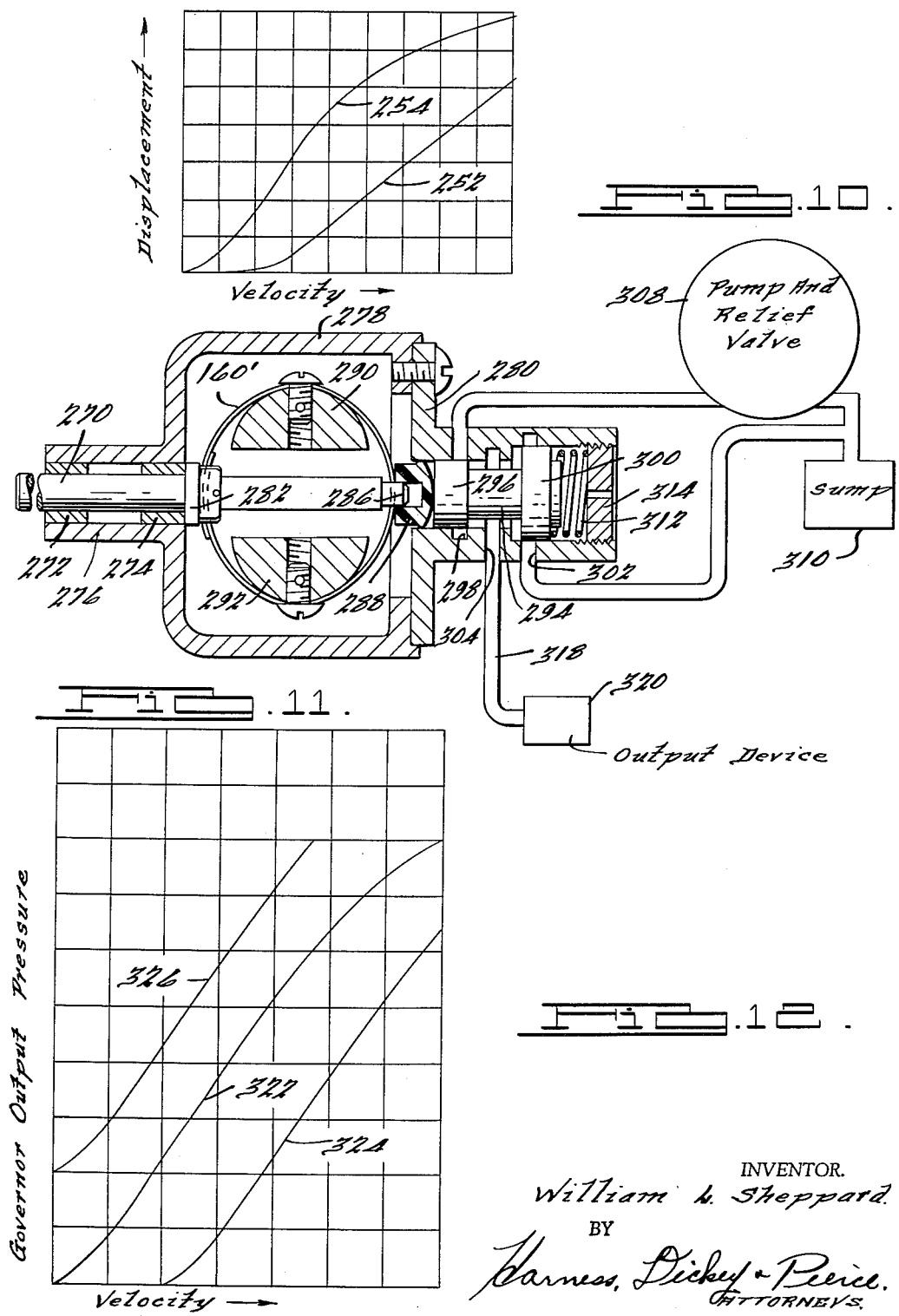
INVENTOR.
William L. Sheppard
BY
Harness, Dickey & Pierce
ATTORNEYS.

United States Patent Office 3,064,669
Patented Nov. 20, 1962

1

3,064,669
GOVERNOR
William L. Sheppard, 36655 Romulus St., Romulus, Mich.
Filed Jan. 4, 1957, Ser. No. 632,470
42 Claims. (Cl. 137—51)

This invention relates to governors.

An object of this invention is to reduce the frictional losses in governor mechanisms.

Another object of this invention is to reduce the cost of manufacture, installation and maintenance of governors.

A further object of this invention is to facilitate the adjustment of the output characteristics of governors.

Another object of this invention is to tailor the output characteristic curves of governors.

Under the principles of the present invention, a governor weight to be rotated is supported by means of an arm the force-deflection characteristics of which vary in accordance with the velocity of rotation. In the illustrated embodiments of the invention, a curvilinear arm, formed of spring metal, is mounted upon a rotatable shaft and secured to a weight having a curved surface. The radial deflection of the weight resulting from rotation of the shaft and arm produces an increase in the area of engagement between the arm and the curved surface of the weight and a corresponding reduction in the effective bendable length of the arm. To facilitate the control of the governor's output element, the spring is bowed to a generally semicircular or semielliptical shape, with two points thereon lying on the axis of rotation and with the weight being secured to the spring at a location between those two points. Means, preferably in the form of a driving clutch, are provided to inhibit relative translational movement between one of those two points on the spring and the body of the governor, whereas the other one of those two points engages the output element of the governor so as to apply a force thereto tending to move that output element in translation relative to the body of the governor, the magnitude of that force varying in accordance with the rotational velocity. That force may permit or produce substantial movement of the output element, as where the output element is the valve spool in a spool type valve, or may permit or produce but minimal movement, as where the output element is a pneumatic-pressure controlling valve cooperating with a valve seat. In a representatively disclosed arrangement, the governor spring is prestressed so as to exert a force upon the output element which decreases with increases in the velocity of rotation, displacement of the output element resulting from the application of an opposing force to that element by other means such as the pressure of the controlled fluid or a separate spring. In each of the disclosed forms, means are provided for adjusting the relative magnitudes of the forces which are applied to the output element at any given rotational velocity.

The manner of accomplishing the foregoing objects, and other objects of the invention, will be perceived from the following detailed description of embodiments of the invention when read with reference to the accompanying drawings in which:

FIG. 1 is a plan view of a governor embodying certain of the principles of the present invention;

FIG. 2 is an enlarged sectional view taken substantially along the line 2—2 of FIG. 1;

FIG. 3 is a sectional view taken substantially along the line 3—3 of FIG. 2;

FIG. 4 is a plan view, in reduced size, of a spring element employed in the governor illustrated in FIGS. 1 to 3 of the drawings at one stage in its construction;

2

FIG. 5 is a side elevational view of a sub-assembly of the governor illustrated in FIGS. 1 to 3 of the drawings, including the spring illustrated in FIG. 4, in the shape which it assumes prior to assembly to the rest of the elements of the governor;

FIG. 6 is a graphical representation of certain pressure versus velocity relationships occurring in one form of conventional governor, as well as certain pressure-velocity relationships in the governor of FIGS. 1 to 3 when that governor is employed as a part of an air-pressure controlling system;

FIG. 7 is a graphical representation of certain displacement versus velocity relationships which may exist in governors constructed in accordance with the principles of the present invention;

FIG. 8 is an elevational view of a modified form of the subassembly illustrated in FIG. 5;

FIG. 9 is a plan view, in reduced size, of a modified form of the spring element illustrated in FIG. 4;

FIG. 10 is a graphical representation of certain displacement versus velocity relationships which may exist in a modified form of the governor;

FIG. 11 is an enlarged sectional view of a hydraulic governor embodying certain of the principles of the present invention; and FIG. 12 is a graphical representation of certain output pressure versus velocity relationships which can occur in the governor of FIG. 11.

The governor illustrated in FIG. 1 of the drawings is representatively adapted for use as a pneumatic pressure controller in a system for governing the road speed of a vehicle. Details of such a system, including the governor of FIG. 1, are disclosed in my copending application entitled "Governing System," Serial No. 632,541, filed on even date herewith, and the disclosure of that application is incorporated herein by reference and is intended to be as much a part of the present disclosure as if it had been fully reproduced herein.

To drive the movable elements of the governor, the governor body 108 may be disposed between the speedometer and the speedometer cable of the vehicle, and to facilitate that representative association, the body 108 terminates at one end in a fitting 26 adapted to engage a fitting on the speedometer, and a fitting 28 adapted to engage a fitting on the speedometer cable.

The governor is further provided with two ports one of which is connected to the atmosphere and the other of which, port 30, is connectable to a source of reduced air pressure (such as to the intake manifold of an internal combustion engine) through a pressure-responsive mechanism to be controlled such as the control valve disclosed in the noted copending application. A valve in the governor interconnects port 30 and the atmosphere to a variable degree determined by the velocity at which the movable elements of the governor are rotated, the degree of that interconnection being also manually settable to permit shifting of the output pressure versus velocity characteristic curves of the unit, as shown in the noted copending application. This control is exercised through a lever 32 (FIG. 2) mounted on and rotated about the longitudinal axis of the governor through a limited arc of movement. One end of a ball-type chain 34 is secured to the lever 32 and the other end of that chain extends to a manually rotatable shaft such as that disclosed in my copending application.

As may best be seen in FIG. 2, the body portion 108 is hollow to define an enlarged cavity 110. A section having reduced inner and outer diameters is formed integrally with housing 108 and is externally threaded to define the fitting 28 which is adapted to accept the nut at the end of the conventional speedometer cable assembly. Adjacent the junction between the main body of the housing 108 and the fitting 28, the inner wall of the housing 110 tapers as at 112 and is then recessed to define an annular shoulder 114. The central bore 116 in the fitting portion 28 terminates at the shoulder 114.

A generally tubular extension 118 having a flange 120 is secured to the open end of housing 108 in any suitable fashion such as by crimping the edge of the housing 108 over the flange 120 as at 122. The nut 26, adapted to engage the hollow, threaded projecting stud on a conventional speedometer, is secured upon the extension 118 so that relative rotational motion therebetween is prevented. In the adjustment of the unit, the rotational position of the governor is shifted relative to the speedometer or to some other relatively fixed element, with the governor being then locked in the adjusted position. This is accomplished, in the representative arrangement disclosed, by providing mating threads on the nut 26 and on the extension 118 having a pitch different than the pitch of the threads on the speedometer and the threads mating therewith on the right-hand portion of nut 26. At the present time, male studs on speedometers are customarily formed with sixteen threads per inch and, in one satisfactorily operating arrangement thirty-two threads per inch were formed on the end of extension 118 and on the left-hand portion of nut 26.

A shaft 124 is disposed axially of the housing 108 and of the extension 118. The central portion of the shaft 124 is circular cylindrical. The right-hand end of shaft 124, in the view of FIGURE 2, is formed with a square cross section similar to the end of the speedometer cable and this end portion enters and engages movable portions of the speedometer in the same fashion as the end of the speedometer cable normally engages the speedometer. It will be appreciated, of course, that if clips or other end fittings are provided upon the speedometer cable, similar fittings should be provided upon the end of shaft 124.

The left-hand portion 126 of shaft 124 is of greater diameter than the central portion of that shaft, the junction between those portions defining a shoulder 128. End portion 126 is provided with a longitudinal recess a portion 130 of which has a square cross section to define a socket for accepting the end of the speedometer cable. Socket 130 may be formed, for example, by boring and counterboring end portion 126 of shaft 124 and then upsetting the central part of the end portion 126, as shown, to force the central portion of the bar into a square configuration.

The counterbored end of portion 126 is flared outwardly as at 132 over the end of a thrust collar 134 of steel or other similar material. In the disclosed arrangement, thrust collar 134 rotates with shaft 124 relative to fitting 28 and housing 108. The right-hand face of thrust collar 134 abuts a bearing 136 press fitted within the bore 116 in the fitting 28, the right-hand face of bearing 136 extending slightly to the right of shoulder 114, as shown. Bearing 136 constitutes the primary supporting means for the shaft 124 although the right-hand end of that shaft is or may be supported by the bearings in the speedometer.

It is important to the operation of the disclosed governor that there be no air leakage past the bearing 136 into the chamber 110, either between the bearing 136 and the wall of the fitting 28 or between the bearing and the surface of the end portion 126 of the shaft 124 which is rotating relative to that bearing. Yet, the provided seal must not offer any substantial resistance to the rotation of shaft 124 since it is important that the governor as a unit require very little torque to produce rotation thereof at the speedometer cable rotational speed, for otherwise the load imposed upon the cable is greater than that for which it is designed and cable breakage or malfunctioning may occur. It has been found that a seal having these characteristics may be achieved by employing a normally planar annular plastic disc deformed from its planar configuration when in position in the unit. Thus, a plastic annulus 140, successfully manufactured of a polytetrafluoroethylene resin commercially sold under the name Teflon, is disposed in the recess at the end of the cavity 110 and against the shoulder 114. The central aperture in the annulus 140 is smaller than the diameter of the bore 116 and only slightly larger than the outer diameter of the shaft portion 126. A washer 142 made, for example, of steel is positioned against the plastic disc seal 140 and serves to clamp that seal in place, the washer 142 being staked in position, portions of the wall 112 being extruded over the edge of the washer 142 at a plurality of points around the edge of the washer 142 as may best be seen in the sectional view of FIGURE 3. It will be observed that the aperture in the washer 142 is appreciably greater in diameter than the aperture in the seal 140 and greater in diameter than bore 116 so that it is only the outer edge of the disc 140 which is clamped. Since the bearing 136 projects to the right of the shoulder 114 as previously noted, the central portion of the plastic disc 140 is deflected rightwardly from the plane of the outer edge of that disc. The portion of the disc 140 adjacent the central aperture therein is trapped between the bearing 136 and the shoulder 128 on the shaft 124 so that that inner portion is in a plane different from but parallel with the plane of the outer edge of the disc 140. During the flaring operation at which the lip 132 is established, the shoulder 128 is positioned so that it will be lightly seated against the seal 140. The light seating is necessary to prevent the frictional engagement between the shoulder 142 and the seal 140 impeding the free rotational motion of the shaft 124.

A sleeve 146 is slideably disposed within the central bore in the extension 118. Under all operative conditions, a portion of this sleeve protrudes to the left of that bore so that a seal 148, seated in a counterbore in the flange 120, continuously engages the surface of the sleeve 146, forming an airtight seal between the outer diameter of the sleeve 146 and the bore in extension 118. The left-hand end of sleeve 146 is counterbored to define an annular shoulder 150 which, as will be seen, serves as a valve seat. The central bore in the sleeve 146 is sufficiently large to insure that the shaft 124 will not contact that sleeve during its rotation.

As may best be seen in FIGURE 1 of the drawings, the extension 118 is provided with a helical slot 152 extending in the order of 35° to 45° around its circumference. The adjusting lever 32 passes through the helical slot 152 and is secured in a radial aperture in the sleeve 146 (FIG. 2). One end of a helical return spring 154 engages the lever 132 and the other end is anchored to the housing 108 or the extension 118 in any appropriate manner. For example, the other end of spring 154 may encircle output tube 30 or, alternatively, a radial recess may be formed in element 108 or 118 and the end of the spring 154 inserted therein. The spring 154 exerts a force tending to move lever 32 to the position illustrated in FIGURE 2, that is, against the upper end of the slot 152 and in the rearmost of its positions along the longitudinal axis of the governor.

The end one of the balls of the ball-type chain 34 is secured to the lever 32 by means of a clip 156. During the preselection of the governing speed, in the manner above noted, a lever 32 is rotated about the longitudinal axis of the governor and moved along the helical slot 152 so that the longitudinal position of that lever 32 is changed. If the selected speed is being increased, sleeve 146 is advanced to the left in the view of FIGURE 2. Conversely, upon the setting of a lower preselected governed speed, the sleeve 146 is moved to the right in that view. It will be appreciated that other means of adjusting the axial position of sleeve 146 or of adjusting the axial position of any member serving as a counterpart of sleeve 146 may be employed.

The rotatable governor subassembly 158 comprises a spring 160, a clutch bushing 162, a valve bushing 164 and a pair of weights 166 and 168. Rectangular apertures 170 and 172 (FIG. 4), the ends of which are generally arcuate, are formed near each end of the spring 160 and a circular aperture 174 is formed medially of the spring. A pair of apertures 176 and 178 are formed along the longitudinal axis of the spring and intermediate the central aperture 174 and the two end apertures 170 and 172, respectively. Element 160 is preferably of resilient material, and cadmium or zinc plated tempered spring steel has proved satisfactory in practice. In a constructed arrangement, the spring 160 was initially formed in the shape illustrated in FIGURE 4 of the drawings and of stock about 0.002 inch in thickness and about 5/16 of an inch in width.

To produce governor characteristics satisfactory for certain uses, the spring 160 is preformed into a circle with the ends overlapping sufficiently to bring apertures 170 and 172 alignment with one another. Srping 160 is illustrated in its preformed free position in FIGURE 5 of the drawings, with the spring, in that arrangement, being generally circular and prestressed.

The clutch bushing 162 is preferably formed of a wear-resistant deflectable plastic, a polyamide resin commercially sold under the generic name nylon having proved to be satisfactory in use. Bushing 162 includes a centrally apertured head portion 180 (FIG. 5), a pair of diametrically opposed arcuate shoulders 182 and 184, a pair of diametrically opposed arcuate flanges 186 and 188 integral with shoulders 182 and 184, respectively, and a pair of diametrically opposed axially extending arcuate fingers 190 and 192. The inner surfaces of projecting fingers 190 and 192 define, in conjunction with the control aperture in head portion 180, a circular cylindrical surface the diameter of which is but slightly greater than the diameter of that portion of shaft 124 with which clutch bushing 162 is associated. Shoulders 182 and 184 have generally arcuate exterior surfaces so that they in combination define a generally rectangular element with arcuate ends similar in shape to the apertures 170 and 172 in the spring 160 (FIG. 4). Obviously, the length of the apertures 170 and 172 should be slightly greater than the diameter upon which shoulder surfaces 182 and 184 are formed in view of the curvature of spring 160. The flanges 186 and 188 cooperate with head portion 180 to retain the spring 160 in position upon the bushing 162 when the assembly is in place upon the shaft 124. However, the fact that flanges 186 and 188 are not continuous, coupled with the flexibility of the bushing 162, permits the bushing 162 to be inserted in the apertures 170 and 172 of the spring 160 during the assembly of the governor.

The valve bushing 164, a device the position and forces upon which are controlled by the spring, is advantageously formed of the same material as the clutch bushing 162 and desirably has the same internal diameter. The head portion 194 of bushing 164 is provided with a generally conical recess so that the right-hand face of that bushing, in the view of FIGURE 5, is in the form of a very thin annulus as a valve surface 196 adapted to engage the face 150 of the member 146 (FIG. 2) which serves as a valve seat. The projecting portion 198 (FIG. 5) of the bushing 164 extends through the aperture 174 in the spring 160.

Each of weights 166 and 168 in the general form of a segment of a right circular cylinder, the radius of the cylinder being less than the radius upon which the spring 160 is preformed. In a constructed arrangement which produced a characteristic curve of satisfactory form, the radius of curvature of the major surfaces of the weights 166 and 168 was about 0.196 inch whereas the radius of curvature to which the spring 160 was formed was in the order of 5/16 of an inch, that is, in the constructed arrangement, the radius of curvature of the weights was about 37% less than the radius to which the spring 160 was preformed. The chord 200 of the weight 166, for example, is below the diameter of the circle upon which the circular surface of the weight 166 is formed. Thus, in construction arrangement, the height of the weights was some 15% greater than the radius of curvature. The length of the weights 166 and 168, as illustrated in FIGURE 3 of the drawings, is slightly greater than the width of the spring 160. While the radius of curvature of the weights 166 and 168 relative to the radius of curvature of spring 160 in its free position is significant, as will be described, to the output characteristics of the governor, the height and length of the weights control primarily only the pass of the weights and may be adjusted relative to one another as desired. In the illustrated form, the edges of each of the weights, as weight 166, are chamfered as at 202 and 204 to insure clearance between the weights and the bushings 164 and 162, respectively. To obtain a relatively large mass for the size of the weights, the weights 166 and 168 can be formed of lead. Each of those weights is provided with an upstanding stud which extends through the apertures 176 and 178, respectively, and is headed over as at 206 and 208, respectively, to secure the weights to the spring 160.

While the weights 166 and 168 are shown to be in engagement with the ends of fingers 190 and 192 in the view of FIGURE 5, when the subassembly 158 is placed in position upon the shaft 124 (FIG. 2), the spring 160 is deformed into a generally elliptical shape since, in the preferred arrangement, the distance between the right-hand face of shoulder 128 on shaft 124 and the valve seat 150 is less than the distance between the faces of clutch bushing head 162 and of valve bushing head 164 when the subassembly 158 is in its free position as shown in FIGURE 5. As a result of this deformation, the weights 166 and 168 are moved to the position shown in FIGURE 2 of the drawings, in which they adequately clear the clutch bushing 162.

The compressing, deforming or bowing of the spring 160 into an elliptical shape effectively prestresses the spring 160 so that forces are exerted tending to move clutch bushing 162 to the left in the view of FIGURE 2 and valve bushing 164 to the right. The former force tends to establish a driving relationship between the face of bushing 162 and the shoulder 128 so that the governor subassembly 158 will be forced to rotate with shaft 124. The latter of these forces tends to bring the face of valve bushing 164 into intimate engagement with the valve seat 150.

Since the chamber 212 defined by the bore of the extension 118 is connected to the outer air by a port 214 formed through the wall of the extension 118, that chamber 112 will, under all operational conditions, be at the ambient air pressure. As was above noted, the port 30, communicating with the chamber 110, is connected to a source of reduced air pressure and under normal operational conditions of the governor, chamber 110 will be at an air pressure less than the ambient air pressure. Consequently, with the unit at rest and with spring 160 exerting a substantial force tending to maintain valve bushing 164 against valve seat 150, a substantial pressure differential will exist between chambers 110 and 212. The magnitude of this pressure differential will, of course, be determined by the extent of the preloading of spring 160 as manifested in the force by which valve bushing 164 is pressed into engagement with valve seat 150. In general, within limits, the pressure in cavity 110 will be equal to the ambient pressure in chamber 212 less the quotient of the spring force exerted upon the valve bushing 164, pressing it into engagement with valve seat 150, divided by the effective area of the valve. The effective valve area is the circle defined by the inner surface of the valve lip 196 less the area of the shaft 124 at the valve. The extent of this pre-loading, and hence the pressure within the cavity 110, may, of course, be adjusted, under both static and dynamic conditions, by rotating the lever 32 to shift the position of sleeve 146 and hence of valve seat 150. If a higher controlled speed is set by shifting the position of lever 32 and advancing the sleeve 146 to the left (FIG. 2) obviously the spring 160 will be distorted into an ellipse having an even greater major axis and a lesser axis and the force pressing valve bushing 164 against valve seat 150 will be increased.

When the vehicle is in motion, shaft 124 is rotated at a speed varying in accordance with the road speed of the vehicle. Centrifugal force acting upon the mass of the weights 166 and 168 will tend to displace those weights radially outwardly to an extent determined by the angular velocity of shaft 124. The effect of this movement of weights 166 and 168 is to tend to further deform spring 160 so that the effect of the pre-loading of spring 160 is absorbed to a varying degree. Consequently, with any given static pre-loading of the valve 164, the force tending to maintain the valve in engagement with seat 150 decreases as a function of the angular velocity of shaft 124. Under normal operating conditions, the valve 164 is not withdrawn from the valve seat 150 adequately to permit cavity 110 to reach atmospheric pressure.

In the disclosed arrangement, the frictional force between the valve bushing 164 and the combination of the spring 160 and shaft 124 is greater than the frictional force between the bushing and the valve seat 150 so that the valve tends to rotate relative to the valve seat 150 upon rotation of the shaft 124, although the relationships may be such, if desired, that the valve 164 will not rotate relative to the seat 150. By using the noted plastic for the valve 164, no substantial wear has been detected even after extended testing of the unit, this being true even though the width of the lips on the valve 164, that is, the width of the annulus of contact between the valve 164 and the valve seat 150 was only four or five thousandths of an inch. While there is no great tendency for the valve seat to wear since the forces in the system are relatively small, it has been found to be advantageous to chrome plate the valve seat 150 to increase its hardness.

Just as the force tending to maintain valve bushing 164 in engagement with the valve seat 150 decreases with increasing rotational velocities of shaft 124, so does the force tending to maintain clutch bushing 162 in engagement with the face of shoulder 128 decrease with increasing road speed. This, of course, tends to reduce the frictional force between those elements and tends to permit clutch bushing 162 to slip with respect to shaft 124. Normally, however, no substantial slippage occurs, for as the force tending to maintain the face of head 180 of clutch bushing 162 (FIG. 5) against the shoulder 128 decreases, the force tending to deflect fingers 190 and 192 towards one another and into tighter engagement with the shaft 124 increases. Consequently, the frictional driving relationship between the clutch bushing 162 and shaft 124 is maintained, the fingers 190 and 192 grasping the shaft more and more firmly as the frictional engagement between the head 180 and the shoulder 128 diminishes.

It will be observed, however, that it is desirable that bushing 162 serve as a clutch to accommodate transient rapid changes of angular velocity of the shaft 124 resulting, for example, from twisting and untwisting of the speedometer cable. To avoid transient misrepresentations, the frictional force between clutch bushing 162 and shaft 124 is so selected that under these transient conditions the clutch will slip relative to the shaft. The frictional engagement between the clutch and the shaft inhibits relative translational movement between the clutch (and hence the adjacent portions of the spring 160) and the shaft 124 (and hence the body 108).

If a conventional governor is utilized to control a similar pneumatic valve, the output pressure will tend to vary nonrectilinearly with velocity changes, the relationship approaching a second-degree curve as is shown at curve 222 in FIGURE 6 of the drawings. With the construction illustrated in FIGURE 2 of the drawings, the change in output pressure in response to changes in the velocity of rotation of shaft 124 approaches a rectilinear relationship as is illustrated in the representative curve 224 in FIGURE 6 of the drawings. Curve 224, of course, represents the relationships at but one setting of the adjusting lever 32, that is, at one preselected governed road speed of the vehicle. The pressure-velocity-curve at other settings of the unit will tend to follow curves generally parallel to but spaced from curve 224.

The difference in the shapes of the output curves 224 and 222 is of course significant in that the use of a governor having an output curve similar to that of curve 224 permits control over a wider range than does the use of a governor having an output characteristic such as curve 222 and hence is illustrated as preferred.

While an explanation of the physical phenomena causing the illustrated governor to produce the indicated output characteristic has not been definitively established, it is the present best theory that these desirable characteristics arise from both the preforming of the spring 160 and from the disparity between the radii of curvature of the spring 160 and of the weights 166 and 168.

Each quarter of the spring 160 may be viewed, for analysis, as in the nature of a bowed, cantilever-mounted single-leafed arm or spring. The bowing may be due totally to preformation beyond the elastic limit of the material, in which case the position of the spring arm when the unit is idle will be the same as the free position of the spring. On the other hand, the bowing, or the extent of the bowing, may result from the deflection of the spring arm from its free to a prestressed position. Viewing the upper right-hand quarter of spring 160 in the view of FIGURE 2, the effective length of that spring is from the point of support of the spring upon the shaft 124 to the point of engagement of the spring with the weight 166. If that spring section acts as a cantilever-mounted rectangular-leaf spring, then the extent of its deflection varies in proportion to the force applied thereon and as a function of the third power of the length. Whether the spring does conform to this relationship or not, the amount of deflection varies with varying force and, in some relationship, with varying effective lengths. As weight 166 moves outwardly, the portion of the total length of this section of spring 160 (and the other sections act correspondingly) which is in engagement with the curved surface of weight 166 incrementally increases so that the effective length of this section of spring 160, that is, the portion of this spring section which is capable thereafter of deflecting, is progressively decreased. In other words, due to the progressive effective shortening of each of the four constituent sections of spring 160, the effective stiffness of the spring increases with increasing rotational velocities so that the force required to produce the next increment of movement is greater than it was for the preceding increment of motion.

The velocity-deflection or velocity-pressure characteristics of the governor may be modified in numerous ways including changing the relative radii of curvature of the spring and the weights, changing the material of which the spring is constructed, by changing the thickness or width of the spring from that shown, and by flanging or otherwise increasing the stiffness of the spring. Other variations are discussed hereinafter.

While the output curve 224 (FIG. 6) is particularly advantageous in certain uses, as for example, in the system disclosed in the above-identified application, substantial differences in the output curves may be obtained by variations in the preforming of the spring 160. For example, if the spring of FIGURE 4 is not preformed to the circle of FIGURE 5 but is forced into that configuration and maintained therein by the clutch bushing 162 (or by riveting or welding if desired), then the spring will be pretensioned even though the subassembly 158 is not yet assembled into the governor. When installed in the governor body, a spring not preformed from its original planar configuration, assumes a shape similar to that represented in FIGURE 2 but its prestress is in a direction to tend to separate valve bushing 164 from its seat 150 when permitted to do so by the outward movement of the weights 166 and 168 under the effects of centrifugal force. Consequently, the unit can be made to produce a distance-velocity or force-velocity relationship in which the rate of change of position or force with changes in velocity is greater at low velocities than at high velocities within the control range. As far as is known, it has not previously been feasible to obtain this type of inverted governor output curves.

It is also contemplated that the initially straight spring may be preformed to other than a circle, such as being preformed into an elliptical shape or being preformed into an irregular shape in which portions thereof are straight and portions thereof are on arcuate or elliptical curves. It is further contemplated that the spring may be formed to a circle, such as shown in FIGURE 5 of the drawings, but with the spring being reversed upon itself to form a circle in the reverse direction of its preformation preparatory to assembly of the unit so that the spring is then prestressed even more greatly than it is when its free position is one of straightness. Other modes of practicing the principles of the invention will be apparent to those skilled in the art on the basis of the information presented. It will also be apparent that while the governor of FIG. 2 is primarily designed for use as a pneumatic pressure controller or air flow regulator, the principles of the invention may be applied to the controlling of hydraulic pressures, as will be discussed. Similarly, the governor assembly may be employed to drive an operating arm coupled to any other appropriate instrumentailty, e.g., to change the pressure upon a carbon pile to vary the resistance offered to the flow of electrical current as a preselected function of the rotational velocity of shaft 124 or of an equivalent shaft, a family of output resistance-velocity curves being obtainable by providing a manually adjustable means for setting the initial pressure on the carbon pile and the initial preloading of the spring 160.

The variations in the output characteristics of governors embodying the principles of the present invention are very much less than with ball-type governors customarily employed. Since there are no pivotal connections imposing friction, substantially the sole frictional loss is in the internal friction of the spring 160, which is so small as to be without significance even in a very small governor. As another substantial advantage of the disclosed construction, the adjustment or preselection may be very readily accomplished, that adjustment being achieved in the disclosed arrangement by simply sliding the valve seat sleeve 146 longitudinally of the extension 118 through the medium of the lever 32. The preselection of the control range may be equally easily achieved in the above-described modifications in which the governor is used other than as a pneumatic pressure controller.

The graph of FIGURE 7 shows a series of curves representing the effects of changing the nature of the performation of the spring and of changing the radius of curvature of the weights. In these tests, the governor was used as a displacement device. In the graph, the abscissa is in terms of velocity. In the tested arrangement, the spring was anchored at a point intermediate the two weights and the physical displacement of a point on the spring diametrically opposed the anchor point was measured with varying rotational velocities. Consequently, the ordinant of the graph of FIGURE 7 is in terms of the displacement of that moving point on the spring relative to an initial positon. Curves 230, 232 and 234 reflect the results of tests performed upon a governor in which the spring was preformed into a circle and similar in form to that illustrated in FIGURE 5 of the drawings. Curve 230 illustrates the operation of such a preformed unit in which the radius of curvature of the circular cylindrical surfaces of the weights was three-eighths of the radius of the spring, curve 232 shows the effect of increasing the radius of curvature of the weights to one-half of the radius of the spring, and curve 234 demonstrates the effect of further increasing the radius of curvature of the weights to three-quarters of the radius of the spring. Curves 236, 238 and 240 depict the results of similar tests performed upon a governor in which the spring was not preformed into a circle prior to assembly but was stressed (within its elastic limit) into a circle as an incident of the assembly of the governor. Again, curves 236, 238 and 240 reflect the effects of changing the radius of the circular cylindrical surfaces of the weights from three-eighths, to one-half, to three-fourths, respectively, of the radius of the spring. These curves support the view that the produced output characteristics results from a velocity-responsive variation of the stiffness or force-displacement charactersitc of the spring accruing from changes in the effective or bendable length of the spring resulting from changes in the radial position of the weights.

It will be observed that under otherwise identical conditions, the flat or non-preformed spring (curves 236 to 240) produced a displacement-velocity output characteristic of somewhat greater slope, for any given weight radius, than did the pre-coiled or preformed spring (curves 230 to 234). It will further be observed that curve 236 is very nearly rectilinear over a major portion of its length, illustrating that governors may be designed under the principles of the invention to produce that output characteristic if desired.

In the modification illustrated in FIGURE 8 of the drawings, a flat spring 242, bent within its elastic limit to a roughly circular shape as an incident of assembly, is reinforced by two leaves 244 ad 246 abutting the spring 242 and secured thereto in any suitable fashion, such as by the weights 248 and 250, respectively. A tested arrangement in which each of the reinforcing leaves 244 and 246 had an arcuate length of about one-quarter of the circumferential length of the circle of spring 242, produced the displacement-velocity output characteristic represented in curve 252 in FIGURE 10 of the drawings.

As another example of a tailored output displacement-velocity characteristic curve, curve 254 in FIG. 10 of the drawings represents the effect of modifying the cross-sectional area of a normally flat governor spring over its effective length. It will be recalled that curves 236 to 240 reflect the displacement-velocity characteristics of a governor in which the spring is normally flat. Curve 254 indicates the change which occurs when that normally flat spring is provided with a cross section such as that illustrated in FIGURE 9 of the drawings. In that modification, the spring thickness is constant, but the spring width at points adjacent the apertures 256 and 258, at which the weights are secured, is about three-eighths of the width of the spring at the overlapped and aligned anchor points 260 and 262 and at the moving point 264, with the spring width tapering intermediate these points as illustrated.

It will of course be appreciated that the force which the governor is capable of exerting upon the output element may be changed in any of a number of ways including those variations in the output force which will accrue from the modifications of the spring shape or preformation above discussed. By mounting another spring and weight assembly upon the same shaft but displaced 90° from the original spring and weight assembly so that the weights do not interfere with one another, the effective output force can be doubled without effectively changing the displacement-velocity of the unit.

The principles of the invention may be applied to the control of any appropriate medium, as is above-noted in part, and as is representatively illustrated by the application of those princples to the control of a hydraulic system as is illustrated in FIGURE 11 of the drawings. In that view, a shaft 270 is rotatably supported by bearings 272 and 274 within the bore of a projection 276 of a hollow body portion 278. The open end of body portion 278 is capped by a centrally bored extension 280. In the illustrated governor, no separate clutch is provided (although such a feature may be provided if desired), but rather the shaft 270 is formed, adjacent its shoulder 282, into a cross section corresponding approximately to the shape of the apertures 170 and 172 of the spring illustrated in FIGURE 4 of the drawings, that is, the shaft has opposing flats to key the spring thereto so that the spring 160' (FIG. 11) and the shaft 270 must rotate together.

A reduced-diameter projection 286 at the end of shaft 270 extends through an aperture in the spring 160' (corresponding to aperture 174 in FIG. 4) and into a seat in a plastic thrust button 288. In the illustrated arrangement, thrust button 288 does not serve as a bearing supporting the shaft 270 in its rotational motion. The thrust button 288 is adapted to move longitudinally of the shaft 270 and to maintain engagement with spring 160' during the axial movement of the portion thereof which is adjacent projection 286 during the operation of the device.

Thrust button 288 abuts the left-hand face of a valve spool 294. Spool 294 cooperates with the bore in the extension 280 to define a spool valve, the land 296 on the spool 294 cooperating with input or pressure port 298 and land 300 cooperating with vent or discharge port 302. An output port 304 communicates with the chamber defined by the walls of the extension 280 and the reduced-diameter central portion of the valve spool 294. As in customary valve practice, the distance between the adjacent faces of the lands 296 and 300 may be approximately equal to or slightly less than the distance between the ports 298 and 302.

Input port 298 is connected to a pump and relief valve 308, and the vent port 302 is connected to the pump and relief valve 308 as well as to a sump 310.

A balance spring 312, acting in compression, is disposed within the bore in extension 280 and extends between the right-hand face of spool 294 and the left-hand face of a vented adjusting screw 314. Consequently, the spring 312 exerts a force tending to move spool 294 to the left, forcing thrust button 288 to the left and deforming spring 160'. Spring 160' prior to assembly to the weights 290 and 292 and shaft 270 may either be preformed into a circle or be flat, the curves as illustrated in FIGURE 12 of the drawings reflecting the output conditions when a preformed spring is used.

In the illustrative arrangement, with the shaft 270 at rest, the force of the balance spring 312 is in equality with the force exerted by the spring 160' tending to move the spool 294 to the right, that is, is in equality with the preload of the spring 160' when the spool 294 is in the illustrated position, blocking both the input or pressure port 298 and the output or vent port 302. As will be apparent to those skilled in the art, the pressure of the hydraulic fluid in the output port 304 and in the tube 318 leading to the controlled or load device 320 will be equal (within the limits of the effectiveness of pump 308) to the instant differential spring force divided by the effective valve reaction area. The differential spring force is equal to the force exerted by valve spring 312 less the opposing force exerted by the spring 160'. The effective reaction area is, of course, equal to the total area of the left-hand face of land 300 less the total area of the right-hand face of the land 296. Under static conditions, the force exerted by balance spring 312 is equal to the pre-loading force exerted by spring 160', as above noted, so that the difference is zero and so that the output pressure at port 304 is theoretically zero. However, as in normal valve practice, some leakage normally occurs so that a minimal pressure normally exists in the output line at any time that the pump 308 is in operation.

As the shaft 270 is rotated, the weights 290 and 292 tend to move outwardly as a function of the velocity of that rotation, absorbing a portion of the preload on the spring 160'. As a result, spring 312 will be able to force spool 294 to the left, correspondingly opening the input port 298 and correspondingly increasing the fluid pressure at output port 304. The greater the velocity of rotation of shaft 270, the further the thrust button 288 and the valve spool 294 move to the left and the greater the output pressure. Curve 322 in FIGURE 12 of the drawings is representative of the operation of the governor of FIG. 11 when used with a pump having the capacity to develop a pressure of, for example, one hundred pounds per square inch. The abscissa of the graph of FIGURE 12 is in terms of the vehicular road speed in miles per hour but can of course be calibrated in terms of the rotational velocity of shaft 270. The ordinant of the curve is in terms of the hydraulic pressure at the output of the governor in pounds per square inch.

Those skilled in the art will appreciate that curve 322 represents a highly desirable form of governor operation for a number of hydraulic applications. For example, in many governor-controlled automatic transmissions the conventional governor characteristic, approaching a second degree curve, has necessitated the use of two separate governors one of which is rendered effective at low speeds and the other of which is rendered effective at higher speeds in order that their composite control characteristic will approach that which can be obtained with a single governor designed in accordance with the principles of the present invention.

Since the output pressure will vary not only with the velocity of rotation of the shaft 270 but also with the effective force exerted by spring 312, a family of output curves may be obtained by adjusting the balance spring 312 by means, for example, of screw 314. Curve 324 in FIGURE 12 illustrates the effect of turning screw 314 to further compress and thereby increase the force exerted by spring 312, whereas curve 326 illustrates the results of reducing the pressure on spring 312 by turning screw 314 in a direction to advance it out of the extension 280. It will be apparent that the force exerted by balance spring 312 may be varied in other ways including, for example, by coupling this spring to the throttle of a vehicle so that the position of the throttle will control the force exerted by the spring and thereby will control the output characteristics of the governor.

While it will be apparent that the embodiments of the invention herein disclosed are well calculated to fulfill the objects of the invention, it will be appreciated that the invention is susceptible to modification, variation and change without departing from the proper scope or fair meaning of the subjoined claims.

What is claimed is:

1. A governor comprising a body, a member supported by said body, a controlled element engageable with said member, means exerting a first force on said element tending to move said element in one direction relative to said member, a generally annular pretensioned spring, means for rotating said spring relative to said body, means inhibiting relative translational motion between a first portion of said spring and said body, a second portion of said spring due to the pretensioning of said spring continuously exerting a second force on said element in a direction opposite to the direction of said first force, and means for varying the magnitude of said second force relative to said first force with variations in the velocity of rotation of said spring comprising a weight secured to said spring between said portions.

2. A pneumatic pressure governor comprising a valve seat, a valve engageable with said valve seat, means for establishing a pressure differential across said valve when said valve is in engagement with said seat, said presure differential producing a first force on said valve acting in one direction, a generally annular pretensioned spring for continuously exerting a second force upon said valve in a direction opposite to said first direction, means for rotating said spring, and means for varying the relative magnitude of said forces comprising a weight secured to said spring and rotatable therewith.

3. A governor comprising a rotatable shaft, a curved spring, a weight secured to said spring, clutch means slip coupling said spring and said shaft for communicating rotational motion of said shaft to said spring and for permitting relative rotation between said spring and said shaft with abrupt transient changes in the rotational velocity of said shaft, and means including said spring for increasing the degree of coupling between said spring and said shaft with increases in the rotational velocity of said shaft throughout a substantial range of rotational velocities of said shaft.

4. A governor comprising a rotatable shaft, a curved spring having an aperture therein, a weight secured to said spring, and clutch means interjoining said spring and said shaft for communicating rotational motion of said shaft to said spring, said clutch means comprising a bushing of resilient material engaging said aperture in said spring and disposed upon and frictionally engaging said shaft and transmitting rotational motion of said shaft to said spring.

5. A governor comprising a rotatable shaft, a curved spring having an aperture therein, a weight secured to said spring, and clutch means interjoining and engaging said spring and said shaft for communicating rotational motion of said shaft to said spring, said clutch means comprising a bushing of resilient material engaging said aperture in said spring and disposed upon said shaft, said bushing having a plurality of spaced-apart projecting fingers engaging said shaft, and means including said spring for increasing the force of engagement between said projecting fingers and said shaft with increases in the velocity of rotation of said shaft.

6. In a governor for association with a vehicle including a speedometer and a speedometer cable both provided with mateable fittings, the combination of a body, a fitting on said body mateable with the speedometer fitting, a fittng on sad body mateable wth the speedometer cable fitting, shaft means drivable by the speedometer cable for driving the speedometer, and velocity responsive means driven by said shaft means comprising a generally annular spring element symmetrical about the axis of rotation of said shaft means and about a line perpendicular to said axis and extending to said axis at each of two spaced-apart points, a pair of weights, means for securing said weights to and in engagement with said spring means to each side of said axis and in the region of said line, and means for mounting said spring element for rotation with said shaft means about said axis.

7. In a governor, the combination of rotatable shaft means rotatable about an axis, over a range of rotational velocities, a controlled element, a second element cooperatively associated with said controlled element, means for progressively changing the effective relationship between said controlled element and said second element in accordance with the rotational velocity of said shaft means and for establishing a preselected certain relationship between said controlled element and said second element at a selectable rotational velocity of said shaft means within said range of rotational velocities comprising a bowed spring element symmetrical about a line perpendicular to said axis, a weight disposed between said spring element and said axis and occupying a major portion of the space between said spring element and said axis, said weight being substantially symmetrical about said line, means securing said weight to said spring element in the region of said line, means including said shaft means for rotating said spring element, and means for progressively and equally increasing the stiffness of the symmetrical sections of said spring element to both sides of said weights with increases of the rotational velocity of said shaft means over said range of rotational velocity comprising a curved surface on said weight to each side of said line engageable with said spring element over a major portion of the length of the corresponding portion of said spring element between said line and said axis and having a curvature differing from the curvature of the adjacent portion of said spring element so that the area of engagement between said spring element and said weight varies with the velocity of rotation of said shaft means, and means for manually and selectively changing the rotational velocity of said shaft means at which said preselected certain relationship between said controlled element and said second element is established comprising adjustable means for concurrently changing the positions of both said controlled element and said second element and the position and shape of portions of said spring element.

8. In a governor, the combination of rotatable shaft means rotatable about an axis over a range of rotational velocities, a controlled element, a second element cooperatively associated with said controlled element, means for progressively changing the effective relationship between said controlled element and said second element in accordance with the rotational velocity of said shaft means and for establishing a preselected certain relationship between said controlled element and said second element at a selectable rotational velocity of said shaft means within said range of rotational velocities comprising a generally annular spring element symmetrical about said axis and symmetrical about a line perpendicular to said axis and having a portion exerting a force on said controlled element due to the resiliency of said spring element, a pair of weights disposed between said spring element and said axis to each side of said axis and occupying a major portion of the space between said spring element and said axis, each of said weights being substantially symmetrical about said line, means securing said weights to said spring element to each side of said axis and in the region of said line, means including said shape means for rotating said spring element, and means for progressively and equally increasing the stiffness of the symmetrical sections of said spring element to both sides of said weights with increases of the rotational velocity of said shaft means over said range of rotational velocities comprising a curved surface on each of said weights to each side of said line engageable with said spring element over a major portion of the length of the corresponding portion of the spring element between said line and said axis and having a curvature differing from the curvature of the adjacent portion of said spring element so that the area of engagement between said spring element and said weights varies with the velocity of rotation of said shaft means, and means for manually and selectively changing the rotational velocity of said shaft means at which said preselected certain relationship between said controlled element and said second element is established comprising adjustable means for concurrently changing the positions of both said controlled element and said second element and the position and shape of portions of said spring element.

9. In a governor, the combination of rotatable shaft means rotatable about an axis over a range of rotational velocities, a controlled element, a second element cooperatively associated with said controlled element, means for progressively changing the effective reltaionship between said controlled element and said second element in accordance with the rotational velocity of said shaft means and for establishing a preselected certain relationship between said controlled element and said second element at a selectable rotational velocity of said shaft means within said range of rotational velocities comprising a bowed spring element symmetrical about a line perpendicular to said axis and extending to the region of said axis at each of two spaced-apart points and having a portion exerting a force on said controlled element due to the resiliency of said spring element, a weight, means for securing said weight to and in engagement with said spring element at a point spaced from said shaft means, means for mounting said spring element for rotation with said shaft means about said axis and for free flexure over the length thereof from said region to the area of engagement with said weight, and means for progressively and equally changing the stiffness of the symmetrical sections of said spring element to both sides of said weight with changes of the rotational velocity of said shaft means over said range of rotational velocities comprising a curved surface on said weight to each side of said line engageable with said spring element and having a curvature differing from the curvature of the adjacent portion of said spring element so that the area of engagement between said spring element and said weight varies with the velocity of rotation of said shaft means, and means for manually and selectively changing the rotational velocity of said shaft means at which said preselected certain relationship between said controlled element and said second element is established comprising adjustable means for concurrently changing the positions of both said controlled element and said second element and the position and shape of portions of said spring element.

10. In a governor, the combination of rotatable shaft means rotatable about an axis over a range of rotational velocities, a controlled element, a second element cooperatively associated with said controlled element, means for progressively changing the effective relationship between said controlled element and said second element in accordance with the rotational velocity of said shaft means and for establishing a preselected certain relationship between said controlled element and said second element at a selectable rotational velocity of said shaft means within said range of rotational velocities comprising a bowed spring element symmetrical about a line perpendicular to said axis and extending to said axis at each of two spaced-apart points and having a portion exerting a force on said controlled element due to the resiliency of said spring element, a weight disposed between said spring element and said axis and occupying a major portion of the space between said spring element and said axis, said weight being substantially symmetrical about said line, means securing said weight to said spring in the region of said line, means for progressively and equally increasing the stiffness of the symmetrical sections of said spring element to both sides of said weight with increases of the rotational velocity of said shaft means over said range of rotational velocities comprising a curved surface on said weight to each side of said line engageable with said spring element over a major portion of the length of the corresponding portion of said spring element between said line and said axis and having a curvature differing from the curvature of the adjacent portion of said spring element so that the area of engagement between said spring element and said weight varies with the velocity of rotation of said shaft means, and means for mounting said spring element for rotation with said shaft means about said axis and for free flexure over the length thereof from said axis to the area of engagement with said weight, and means for manually and selectively changing the rotational velocity of said shaft means at which said preselected certain relationship between said controlled element and said second element is established comprising adjustable means for concurrently changing the positions of both said controlled element and said second element and the positon and shape of portions of said spring element.

11. In a governor, the combination of rotatable shaft means rotatable about an axis over a range of rotational velocities, a controlled element, a second element cooperatively associated with said controlled element, means for progressively changing the effective relationship between said controlled element and said second element in accordance with the rotational velocity of said shaft means and for establishing a preselected certain relationship between said controlled element and said second element at a selectable rotational velocity of said shaft means within said range of rotational velocities comprising a generally annular spring element symmetrical about said axis and symmetrical about a line perpendicular to said axis and extending to said axis at each of two spaced-apart points and having a portion exerting a force on said controlled element due to the resiliency of said spring element, a pair of weights disposed between said spring element and said axis to each side of said axis and occupying a major portion of the space between said spring element and said axis, each of said weights being substantially symmetrical about said line, means securing said weights to said spring to each side of said axis and in the region of said line, means for progressively and equally increasing the stiffness of the symmetrical sections of said spring element to both sides of said weight with increases of the rotational velocity of said shaft means over said range of rotational velocities comprising a curved surface on each of said weights to each side of said line engageable with said spring element over a major portion of the length of the corresponding portion of said spring element between said line and said axis and having a curvature differing from the curvature of the adjacent portion of said spring element so that the area of engagement between said spring element and said weights varies with the velocity of rotation of said shaft means, and means for mounting said spring element for rotation with said shaft means about said axis and for free flexure over the length thereof from said axis to the areas of engagement with said weights, and means for manually and selectively changing the rotational velocity of said shaft means at which said preselected certain relationship between said controlled element and said second element is established comprising adjustable means for concurrently changing the positions of both said controlled element and said second element and the position and shape of portions of said spring element.

12. In a governor, the combination of a bowed spring element having a pair of spaced-apart aligned apertures, rotatable shaft means extending through both of said apertures and rotatable about an axis, a driving coupling at one end of said shaft for transmitting torque to said shaft, a driving coupling at the other end of said shaft for transmitting torque from said shaft, means for establishing a torque transmitting connecton between said shaft means and said spring element at one of said apertures, a weight, and means for securing said weight to said spring element.

13. In a governor, the combination of a bowed spring element having a pair of spaced-apart aligned apertures, rotatable shaft means extending through both of said apertures and rotatable about an axis, a driving coupling at one end of said shaft for transmitting torque to said shaft, a driving coupling at the other end of said shaft for transmitting torque from said shaft, said spring element being symmetrical about a line perpendicular to said axis, means including a friction clutch between said shaft means and said spring element for establishing a torque transmitting connection between said shaft means and said spring element at one of said apertures, a weight, means for securing said weight to said spring element in the region of said line, and means including said spring element for varying the degree to which said friction clutch frictionally interconnects said shaft means and said spring element in accordance with the velocity of rotation of said spring element throughout a substantial range of rotational velocities of said shaft means.

14. In a governor, the combination of a bowed spring element having a pair of spaced-apart aligned apertures, rotatable shaft means extending through both of said apertures and rotatable about an axis, a driving coupling at one end of said shaft for transmitting torque to said shaft, a driven coupling at the other end of said shaft for transmitting torque from said shaft, a weight, means for securing said weight to said spring element, and means including one of said apertures for mounting said spring element for rotation with said shaft means about said axis and for free flexure over the length thereof from said axis to the area of engagement with said weight.

15. In a governor, the combination of a controlled element, a bowed spring element having a pair of spaced-apart aligned apertures and having a portion exerting a force on said controlled element due to the resiliency of said spring element, rotatable shaft means extending through both of said apertures and rotatable about an axis, a driving coupling at one end of said shaft for transmitting torque to said shaft, a driven coupling at the other end of said shaft for transmitting torque from said shaft, a weight disposed between said spring element and said axis and occupying a major portion of the space between said spring element and said axis, said spring element being symmetrical about a line perpendicular to said axis, said weight being substantially symmetrical about said line and engageable with said spring element over a major portion of the length of the corresponding portion of said spring element between said line and said axis and having a curvature differing from the curvature of the adjacent portion of said spring element so that the area of engagement between said spring element and said weight varies with the velocity of rotation of said shaft, and means including said apertures for mounting said spring element for rotation with said shaft means about said axis and for free flexure over the length thereof from the region of said axis to the area of engagement with said weight.

16. In a governor, the combination of a bowed spring element having a pair of spaced-apart aligned apertures, rotatable shaft means extending through both of said apertures and rotatable about an axis, a driving coupling at one end of said shaft for transmitting torque to said shaft, a driving coupling at the other end of said shaft for transmitting torque from said shaft, means for establishing a torque transmitting connection between said shaft means and said spring element at one of said apertures comprising a clutch adapted to slip with abrupt transient changes in the rotational velocity of said shaft means, a weight, and means for securing said weight to said spring element.

17. In a governor, the combination of a bowed spring element having a pair of spaced-apart aligned apertures, rotatable shaft means extending through both of said apertures and rotatable about an axis, a driving coupling at one end of said shaft for transmitting torque to said shaft, a driving coupling at the other end of said shaft for transmitting torque from said shaft, means for establishing a torque transmitting connection between said shaft means and said spring element at one of said apertures comprising a clutch slip coupling said spring element and said shaft means and adapted to slip with abrupt changes in the rotational velocity of said shaft means, a weight, means for securing said weight to said spring element, and means including said spring element for increasing the degree of coupling between said spring element and said shaft means with increases in the velocity of rotation of said shaft means throughout a substantial range of rotational velocities of said shaft means.

18. A governor comprising a body, a member supported by said body, a controlled element engageable with said member, means exerting a first force on said element tending to move said element in one direction relative to said member, a generally annular pretensioned spring, means for rotating said spring relative to said body, means inhibiting relative translational motion between a first portion of said spring and said body, a second portion of said spring due to the pretensioning of said spring continuously exerting a second force on said element in a direction opposite to the direction of said first force, means for varying the magnitude of said second force relative to said first force over a range of magnitudes with variations in the velocity of rotation of said spring comprising a weight secured to said spring between said portions, said member being controllably movable longitudinally of said body relative to said first portion of said spring, and adjusting means for changing the relative magnitudes of said forces independently of changes in the velocity of rotation of said spring, comprising actuator means rotatable about an axis under manual control and effective when rotated in one direction about said axis to exert a positive driving force on said member tending to move said member longitudinally of said body in one direction relative to said first portion of said spring and capable when rotated in the other direction about said axis of exerting a positive driving force on said member tending to move said member longitudinally of said member in the other direction relative to said first portion of said spring.

19. A governor comprising a body, a member supported by said body, a controlled element engageable with said member, means exerting a first force on said element tending to move said element in one direction relative to said member, rotatable shaft means rotatable about an axis, a generally annular pretensioned spring substantially symmetrical about said axis and substantially symmetrical about a line perpendicular to said axis, means connecting one portion of said spring to said shaft means for causing said spring to rotate with said shaft about said axis, means inhibiting relative motion other than rotational between said one portion of said spring and said body, a second portion of said spring due to the pretensioning of said spring continuously exerting a second force on said element in a direction opposite to the direction of said first force, and means for varying the magnitude of said second force relative to said first force over a range of magnitudes of said first force with variations in the velocity of rotation of said spring comprising a pair of weights secured to said spring and disposed between said spring and said shaft means on each side of said axis and exerting forces on said spring during rotation of said spring and said weights tending to reduce the magnitude of the force exerted on said element due to the pretensioning of said spring in accordance with the velocity of rotation of said spring and said weights, each of said weights being substantially symmetrical about said line.

20. The combination of claim 19 in which said governor is a pneumatic pressure governor, in which said means connecting one portion of said spring to said shaft means includes an apertured friction clutch, in which said member is an apertured valve seat, in which said element is an apertured valve engageable with said valve seat, in which said shaft means extends through the apertures in said clutch, in said valve, and in said valve seat, in which said first force is established as a result of a pneumatic pressure differential, and in which said pressure differential reduces with reduction of the magnitude of said second force over a range of variation of the magnitude of said second force.

21. A pneumatic pressure governor comprising an apertured valve seat, a valve engageable with said valve seat and having an aperture alignable with the aperture in said valve seat, a rotatable shaft supported for rotation about its longitudinal axis and extending through the apertures in said valve seat and valve, a driving coupling at one end of said shaft for transmitting torque to said shaft, a driven coupling at the other end of said shaft and beyond said valve seat and valve for transmitting torque from said shaft, and rotational velocity responsive means for exerting a force on said valve which varies over a range in accordance with the rotational velocity of said shaft comprising a bowed spring element rotatable with said shaft and a weight secured to said spring.

22. The combination of claim 21 further including means for establishing a pressure differential across said valve for producing a force opposing the force exerted on said valve by said rotational velocity responsive means.

23. The combination of claim 1 in which said spring is an elongated flat spring having an aperture near each end and an aperture centered therebetween and bowed to bring said end apertures in alignment with one another, and in which said means for rotating said spring includes a rotatable shaft extending through the aligned end apertures and the center aperture and means for transmitting rotational motion of said shaft to said spring.

24. The combination of claim 1 further including means for reducing the magnitude of said first force with reductions in the magnitude of said second force.

25. The combination of claim 2 in which said pressure differential reduces with reductions of the magnitude of said second force over a range of variation of the magnitude of said second force.

26. The combination of claim 1 in which said means exerting a first force on said element includes another spring acting against said element.

27. The combination of claim 26 in which said governor is a hydraulic governor, in which said control element is a hydraulic valve spool, and in which said member is a portion integral with said body and having a hydraulic port controlled by said valve spool.

28. The combination of claim 7 in which said spring element varies in cross-section over a portion of the length thereof including and extending to both sides of said line.

29. In a governor, the combination of rotatable shaft means rotatable about an axis over a range of rotational velocities, a controlled element, a second element cooperatively associated with said controlled element, means for progressively changing the effective relationship between said controlled element and said second element in accordance with the rotational velocity of said shaft means and for establishing a preselected certain relationship between said controlled element and said second element at a selectable rotational velocity of said shaft means within said range of rotational velocities comprising a bowed spring element having a portion exerting a force on said controlled element due to the resiliency of said spring element, a weight, means securing said weight to said spring element at a point spaced from said axis, means including said shaft for rotating said spring element, the rotation of said weight resulting from rotation of said spring element producing a change in the magnitude of the force exerted on said controlled element by said spring element, and means for progressively changing the stiffness of the sections of said spring element to each side of said weight with changes of the rotational velocity of said shaft means over said range of rotational velocities comprising a curved surface on said weight at each side thereof engageable with said spring element at each side thereof and having a curvature differing from the curvature of the adjacent portion of said spring element so that the area of engagement between said spring element and said weight varies with the velocity of rotation of said shaft means, and means for manually and selectively changing the rotational velocity of said shaft means at which said preselected certain relationship between said controlled element and said second element is established comprising adjustable means for concurrently changing the positions of both said controlled element and said second element and the position and shape of portions of said spring element.

30. The combination of claim 9 in which said spring element is mounted for free flexure over the entire length thereof from said axis to the area of engagement with said weight.

31. The combination of claim 9 in which said weight is disposed between said element and said axis in the region of said line, in which the stiffness of the symmetrical sections of the spring element is increased with increases of the rotational velocity of said shaft means, and in which the area of engagement between said spring element and said weight increases with increases of the velocity of rotation of said shaft means.

32. The combination of claim 1 further including means for changing the relationship between the magnitude of said second force and said velocity of rotation of said spring in accordance with the velocity of rotation of said spring comprising a curved surface on said weight engageable with said spring and having a curvature differing from the curvature of the adjacent portion of said spring and changing in length of engagement with said adjacent portion with variations in the velocity of rotation of said spring.

33. The combination of claim 1 in which said generally annular spring is rotated about an axis through said first and second portions, in which said weight is secured to said spring at one side of said axis, and in which another weight is secured to said spring at the other side of said axis and substantially diametrically opposite to the first weight.

34. The combination of claim 33 further including means for changing the relationship between the magnitude of said second force and said velocity of rotation of said spring in accordance wtih the velocity of rotation of said spring comprising curved surfaces on each of said weights engageable with portions of said spring adjacent and at each side of each of said weights and having curvatures differing from the curvatures of said adjacent portions of said spring and chanigng in length of engagement with said adjacent portions with variations in the velocity of rotation of said spring.

35. A fluid-pressure regulating governor comprising a sealed housing including a chamber, first port means adapted to connect said housing to one source of fluid through a fluid-pressure responsive device, second port means connecting said housing to a second source of fluid pressure, valve means controlling said second port means, and rotatable speed-responsive means in said chamber controlling said valve means and maintaining said chamber at a pressure different than the pressure of said second source.

36. In a governor, a generally annular thin spring rotatable about an axis and having an aperture therein at said axis, and fluid-pressure modulating valve means comprising cooperating valve and seat portions, one of said portions being seated in said aperture and secured to said spring.

37. In a fluid-pressure controlling governor, a hollow housing assembly having a bore portion, a first annular portion adjacent the outer end of said bore portion, a second annular portion adjacent the inner end of said bore portion, and a third annular portion coaxial with said second annular portion but spaced radially outwardly therefrom and displaced axially therefrom in a direction toward said outer end of said bore portion, a shaft rotatably disposed in said bore portion and extending therethrough, means engaging said shaft and said first annular portion for limiting movement of said shaft relative to said housing in one axial direction, a shoulder on said shaft spaced from said inner end of said bore portion, an annular plastic sealing element surrounding said shaft and having a central portion on one face engaging one face of said shoulder, a portion on the other face engaging said second annular portion, and an outer portion on said other face abutting said third annular portion, and means engaging said other face of said sealing element for clamping said outer portion against said third annular portion.

38. In a fluid-pressure controlling governor, a hollow housing assembly having a bore portion, a first annular portion adjacent the outer end of said bore portion, a second annular portion adjacent the inner end of said bore portion, and a third annular portion coaxial with said second annular portion but spaced radially outwardly therefrom and displaced axially therefrom in a direction toward said outer end of said bore portion, a shaft rotatably disposed in said bore portion and extending therethrough, means engaging said shaft and said first annular portion for limiting movement of said shaft relative to said housing in one axial direction, a shoulder on said shaft spaced from said inner end of said bore portion, an annular plastic sealing element surrounding said shaft and having a central portion on one face engaging one face of said shoulder, a portion on the other face engaging said second annular portion, and an outer portion on said other face abutting said third annular portion, means engaging said other face of said sealing element for clamping said outer portion against said other face, a generally annular spring on said shaft and having aligned diametrically opposed apertures accepting said shaft, a pair of weights secured to said spring at diametrically opposed points spaced from said shaft, plastic slip-clutch means disposed on said shaft and engaging one of said apertures and butting the other face of said shoulder, and pneumatic valve means for controlling the pressure in said hollow housing assembly controlled by said generally annular spring.

39. In an air-pressure controlling rotational-velocity-responsive mechanism, body means having a chamber therein connectable to a source of air at a pressure differing from atmospheric, pneumatic valve means controlling the flow of air through said chamber and including an apertured valve seat portion and a valve portion engageable with said valve seat portion and having an aperture aligned with the aperture in said valve seat portion, rotatable shaft means supported for rotation about its longitudinal axis and extending through the apertures in both of said portions, and rotational-velocity-responsive means disposed in said chamber for exerting a force on said one of said portions which varies over a range in accordance with the rotational velocity of said rotatable shaft means comprising a link element rotatable with said shaft means and weight means carried by said link.

40. In combination, a rotatable shaft, link means, a weight secured to said link means, clutch means slip-coupling said link means and said shaft for communicating rotational motion of said shaft to said link means and for permitting relative rotation between said link means and said shaft with abrupt transient changes in the rotational velocity of said shaft, and means including said link means for changing the degree of coupling between said link means and said shaft with changes in the rotational velocity of said shaft throughout a substantial range of rotational velocities of said shaft.

41. In combination, a rotatable shaft, first and second link means each having an aperture near one end, a weight carried by the other end of each of said link means, slip-clutch bushing means on said shaft and engaging the apertures in both of said link means for communicating rotational motion of said shaft to both of said link means and hence to said weights and for permitting relative rotation between said link means and said shaft with abrupt transient changes in the rotational velocity of said shaft, both of said link means tending to be tilted about an axis transverse of said shaft in response to outward movement of said weights with increasing rotational velocities of said weights, and means including both of said link means and effective in response to said tilting of said link means for progressively increasing the degree of coupling between both of said link means and said shaft with increases in the rotational velocity of said shaft throughout a substantial range of rotational velocities of said shaft.

42. The combination of claim 2 in which variations of the velocity of rotation of said spring produce corresponding changes in the magnitude of said second force, and in which changes in the relationship between said valve and valve seat resulting from said changes in the magnitude of said second force produce corresponding changes in the magnitude of the pressure differential across said valve and corresponding changes in the magnitude of said first force.

References Cited in the file of this patent

UNITED STATES PATENTS

| | | |
|---|---|---|
| 65,444 | Stewart | June 4, 1867 |
| 162,219 | Chase | Apr. 20, 1875 |
| 331,517 | McCarty | Dec. 1, 1885 |
| 404,783 | Gartner | June 4, 1889 |
| 1,236,449 | Kirkman | Aug. 14, 1917 |
| 2,441,811 | Gottlieb | May 18, 1948 |
| 2,446,861 | Warner | Aug. 10, 1948 |
| 2,467,445 | Schwendner | Apr. 19, 1949 |
| 2,623,962 | Holstein | Dec. 30, 1952 |
| 2,645,237 | Wheeler | July 14, 1953 |
| 2,701,035 | Leichsenring | Feb. 1, 1955 |
| 2,797,080 | Johnson | Jan. 25, 1957 |

FOREIGN PATENTS

| | | |
|---|---|---|
| 181,103 | Germany | Feb. 11, 1907 |
| 692,849 | France | Aug. 11, 1930 |

UNITED STATES PATENT OFFICE
CERTIFICATE OF CORRECTION

Patent No. 3,064,669                                November 20, 1962

William L. Sheppard

It is hereby certified that error appears in the above numbered patent requiring correction and that the said Letters Patent should read as corrected below.

Column 5, line 20, after "172" insert -- into --; same line 20, for "Srping" read -- Spring --; line 34, for "control" read -- central --; lines 59 and 60, after "annulus" insert --serving --; column 6, line 4, for "construction" read -- constructed --; line 13, for "pass" read -- mass --; column 7, line 6, after "lesser" insert -- minor --; column 9, lines 33 and 34, for "instrumentailty" read -- instrumentality --; line 70, for "positon" read -- position --; column 10, line 16, for "results" read -- result --; column 12, line 70, for "presure" read -- pressure --; column 13, line 39, for "sad" read -- said --; line 63, after "axis" and before the comma insert -- and having a portion exerting a force on said controlled element due to the resiliency of said spring element --; line 72, for "weights" read -- weight --; line 74, for "velocity" read -- velocities --; column 14, line 37, for "shape" read -- shaft --; column 15, line 67, for "positon" read -- position --; column 20, line 30, for "chanigng" read -- changing --.

Signed and sealed this 25th day of June 1963.

(SEAL)
Attest:

ERNEST W. SWIDER

Attesting Officer

DAVID L. LADD

Commissioner of Patents